US010657544B2

(12) United States Patent
Cecchi et al.

(10) Patent No.: US 10,657,544 B2
(45) Date of Patent: *May 19, 2020

(54) TARGETED E-COMMERCE BUSINESS STRATEGIES BASED ON AFFILIATION NETWORKS DERIVED FROM PREDICTIVE COGNITIVE TRAITS

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/950,000

(22) Filed: Nov. 24, 2015

(65) Prior Publication Data

US 2016/0379267 A1 Dec. 29, 2016

Related U.S. Application Data

(63) Continuation of application No. 14/747,078, filed on Jun. 23, 2015.

(51) Int. Cl.
*G06Q 30/02* (2012.01)
*G06N 20/00* (2019.01)
(Continued)

(52) U.S. Cl.
CPC .......... *G06Q 30/0201* (2013.01); *G06N 5/04* (2013.01); *G06N 20/00* (2019.01);
(Continued)

(58) Field of Classification Search
CPC .......... G06Q 30/0201; G06Q 30/0269; G06Q 30/0276; G06Q 30/0255; G06Q 30/0245; G06N 20/00; G06N 5/04; G06N 3/006
See application file for complete search history.

(56) References Cited

U.S. PATENT DOCUMENTS

| 8,189,905 B2 * | 5/2012 | Eaton | G06K 9/00335 |
| | | | 382/159 |
| 2005/0216516 A1 * | 9/2005 | Calistri-Yeh | G06F 17/3069 |

(Continued)

FOREIGN PATENT DOCUMENTS

| WO | 2006133229 A2 | 12/2006 |
| WO | 2008073717 A2 | 6/2008 |

OTHER PUBLICATIONS

Fist of IBM Patents or Patent Applications Treated as Related; Date Filed: Nov. 24, 2015, 2 pages.

(Continued)

*Primary Examiner* — Alexandru Cirnu
(74) *Attorney, Agent, or Firm* — Cantor Colburn LLP; Anthony Curro

(57) ABSTRACT

Embodiments are directed to a computer implemented business campaign development system. The system includes an electronic tool configured to hold data of a user, and an analyzer circuit configured to derive a cognitive trait of the user based at least in part on the data of the user. The system further includes a targeted business strategy development system configured to derive a targeted business strategy based at least in part on the cognitive trait of the user.

3 Claims, 8 Drawing Sheets

(51) Int. Cl.
*G06N 5/04* (2006.01)
*G06N 3/00* (2006.01)

(52) U.S. Cl.
CPC ..... *G06Q 30/0245* (2013.01); *G06Q 30/0255* (2013.01); *G06Q 30/0269* (2013.01); *G06Q 30/0276* (2013.01); *G06N 3/006* (2013.01)

(56) References Cited

U.S. PATENT DOCUMENTS

| | | |
|---|---|---|
| 2006/0085515 A1* | 4/2006 | Kurtz .................... H04L 12/581 709/207 |
| 2007/0050715 A1 | 3/2007 | Behar |
| 2009/0287678 A1 | 11/2009 | Brown et al. |
| 2012/0084811 A1 | 4/2012 | Thompson et al. |
| 2012/0150636 A1* | 6/2012 | Freeman ............ G06Q 30/0241 705/14.49 |
| 2013/0073366 A1 | 3/2013 | Heath |
| 2013/0110583 A1* | 5/2013 | Ormont .................. G06Q 50/01 705/7.29 |
| 2014/0006129 A1 | 1/2014 | Heath |
| 2014/0012842 A1* | 1/2014 | Yan .................... G06F 17/30867 707/732 |
| 2014/0150004 A1* | 5/2014 | Vemparala ......... H04N 21/4758 725/13 |
| 2016/0379224 A1 | 12/2016 | Cecchi et al. |

OTHER PUBLICATIONS

Anonymously; "A Method and System for e-Commerce Promotion Publishing and Subscription"; An IP.com Prior Art Database Technical Disclosure; http://ip.com/IPCOM/000209095; Jul. 28, 2011; 10 pages.

Internet Society Request for Comment et al.; "Electronic Commerce Modeling Language (ECML) Version 2 Specification"; An IP.com Prior Art Database Technical Disclosure; http://ip.com/IPCOM/000125904; Jun. 21, 2005; 36 pages.

Internet Society Requests for Comment et al.; "ECML V1.1: Field Specifications for E-Commerce"; An IP.com Prior Art Database Technical Disclosure; http://ip.com/IPCOM/000005294; Aug. 21, 2001; 22 pages.

Ruikar, K. et al.; "VERDICT—An e-readiness assessment application for construction companies"; Automation in Construction, vol. 15, No. 1; Jan. 2006; pp. 98-110.

Qiu et al., "Intelligent Advertising for User Generated Content through Sentiment Analysis," 2009 International Conference on Advances in Social Network Analysis and Mining, IEEE, 2009, pp. 330-333.

* cited by examiner

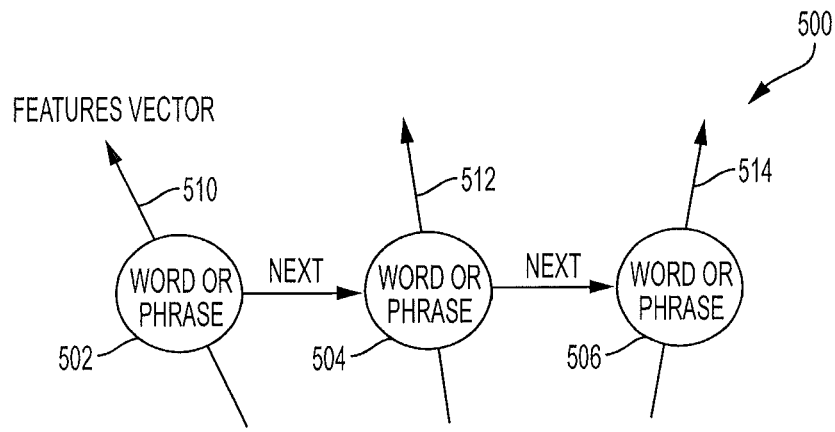
FIG. 5A
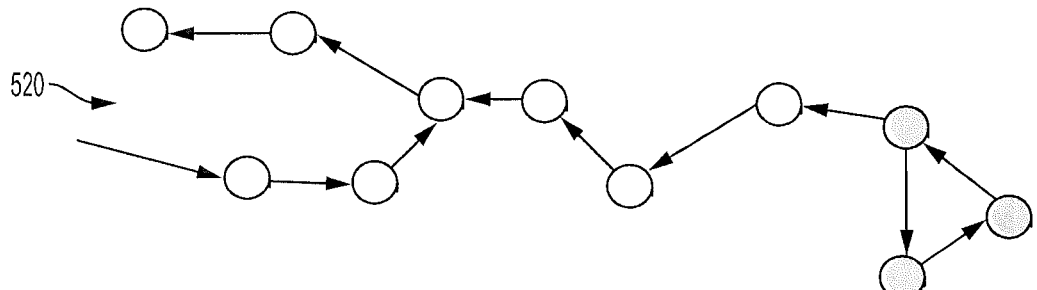
FIG. 5B
$(0,1,0,0...)$             EQUATION A
$sim(a,b) = \vec{W}_a \cdot \vec{W}_b$    EQUATION B
$G = \{N,E,W\}$             EQUATION C
$\vec{W} = \vec{W}_{syn} \oplus \vec{W}_{sem} \oplus \vec{W}_{ntxt}$    EQUATION D
$G_{sk} = \{N,E\}$          EQUATION E
$H = \sum_n E_{nm} \vec{W}_n \vec{W}_m$    EQUATION F
$M = M(\vec{F}_{brain}, C_{brain})$    EQUATION G
$C(sample) = M(\vec{F}_{sample})$    EQUATION H
FIG. 6

TARGETED E-COMMERCE BUSINESS STRATEGIES BASED ON AFFILIATION NETWORKS DERIVED FROM PREDICTIVE COGNITIVE TRAITS

DOMESTIC PRIORITY

The present application claims priority to U.S. Nonprovisional application Ser. No. 14/747,078 filed on Jun. 23, 2015 titled "TARGETED E-COMMERCE BUSINESS STRATEGIES BASED ON AFFILIATION NETWORKS DERIVED FROM PREDICTIVE COGNITIVE TRAITS," assigned to the assignee hereof and expressly incorporated by reference herein.

BACKGROUND

The present disclosure relates in general to systems and methodologies for developing e-commerce business strategies. More specifically, the present disclosure relates to systems and methodologies for developing targeted marketing-type and advertising-type e-commerce business strategies based on the identification and grouping of predictive cognitive traits from among a population.

The ability to target advertisements, in terms of both content and scope, to specific population segments is a fundamental requirement for effective marketing and advertising campaigns. Marketing and advertising business strategies often involve an analysis of a population's tastes and needs based on information that members of the population share through various electronic media. In e-commerce settings, for example, the analysis employed is often semantic, wherein what a user searches or writes about is used to infer what a user needs. An example of a semantic-based advertising strategy is known generally as semantic targeting. Semantic targeting is a technique enabling the delivery of targeted advertising for advertisements appearing on websites and is used by online publishers and advertisers to increase the effectiveness of their campaigns. The selection of advertisements is served by automated systems based on the content displayed to the user.

Semantic-based marketing and advertising strategies typically involve scanning the content of web-pages to identify keywords. However, such systems are unable to identify the context of the entire page and therefore the inferences drawn from such analysis is inherently imprecise. For example, the word "orange" can be a color, a fruit, a telecommunications company, a mountain bike, and countless other variants.

Social network information is also used to analyze a population's tastes and needs. In a typical configuration, social network information is aggregated and associated statically with users and their social networks. Social network information is limited in that the extracted data is focused on users who have established connections to one another through the social network, and users outside of that social network are not typically included.

Neither sematic-based marketing and advertising strategies nor social network information analysis techniques create categories of potential e-commerce marketing or advertising population segments rapidly and dynamically, and independently from the limitations of traditional semantic-based or social network-based analyses.

SUMMARY

Embodiments are directed to a computer implemented business campaign development system. The system includes an electronic tool configured to hold data of a user, and an analyzer circuit configured to derive a cognitive trait of the user based at least in part on the data of the user. The system further includes a targeted business strategy development system configured to derive a targeted business strategy based at least in part on the cognitive trait of the user.

Embodiments are further directed to a computer implemented method of developing a business campaign. The method includes storing, using a memory, data of a user, and deriving, using an analyzer circuit, a cognitive trait of the user based at least in part on the data of the user. The method further includes deriving, using a targeted business strategy development system, a targeted business strategy based at least in part on the cognitive trait of the user.

Embodiments are further directed to a computer program product for implementing a business campaign. The computer program product includes a computer readable storage medium having program instructions embodied therewith, wherein the computer readable storage medium is not a transitory signal per se. The program instructions are readable by a processor circuit to cause the processor circuit to perform a method that includes storing, by a memory of the processor circuit, data of a user. The method further includes deriving, using an analyzer circuit, a cognitive trait of the user based at least in part on the data of the user. The method further includes deriving, using a targeted business strategy development system, a targeted business strategy based at least in part on the cognitive trait of the user.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 5A depicts a graphical text analyzer's output feature vector comprising an ordered set of words or phrases, wherein each is represented by its own vector according to one or more embodiments;

FIG. 5B depicts a graph of communications according to one or more embodiments of the disclosure;

FIG. 6 depicts various equations illustrating a core algorithm of a graphical text analyzer in accordance with one or more embodiments;

Figure 1:
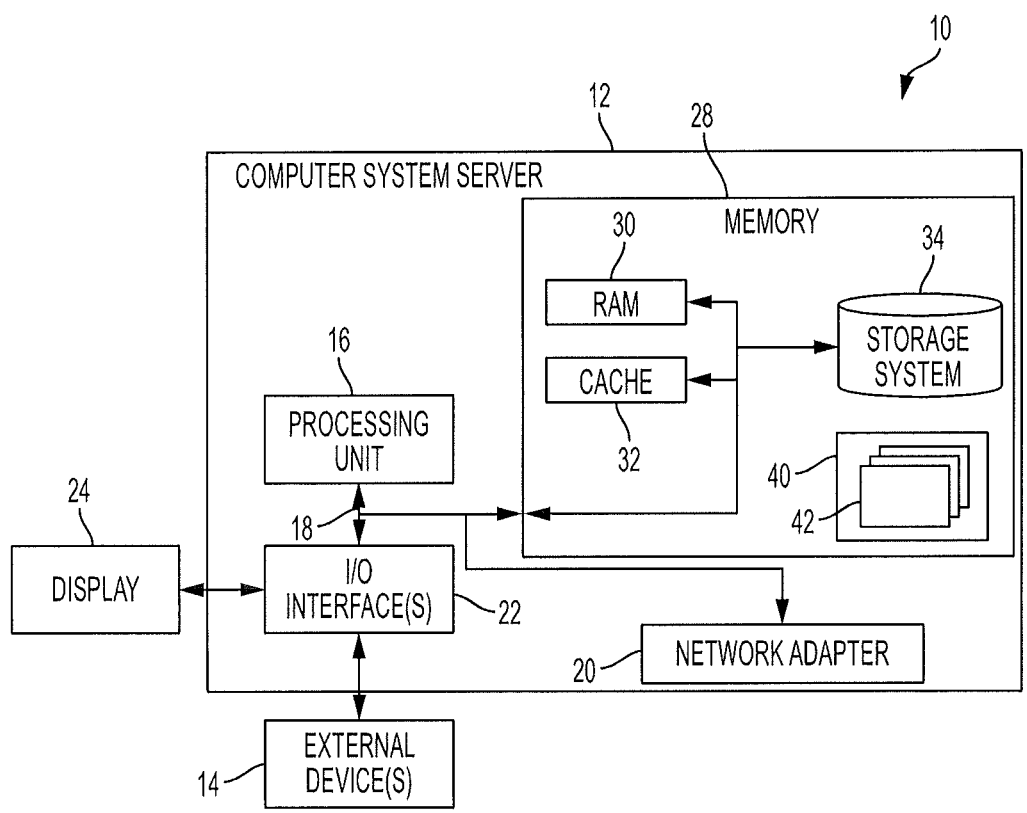
FIG. 1 depicts a cloud computing node according to one or more embodiments.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Additionally, although this disclosure includes a detailed description of analyzing text in order to derive parameters of a marketing-type or advertising-type e-commerce business strategy/campaign development system, implementation of the teachings recited herein are not limited to marketing-type or advertising-type business strategy/campaign development systems. Rather, embodiments of the present disclosure are capable of being implemented in conjunction with any other type of business strategy/campaign development system, now known or later developed, wherein the strategy/campaign is focused and targeted based at least in part on the identification and grouping of communication targets using the identification, analysis and grouping of predictive cognitive traits from among a population.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
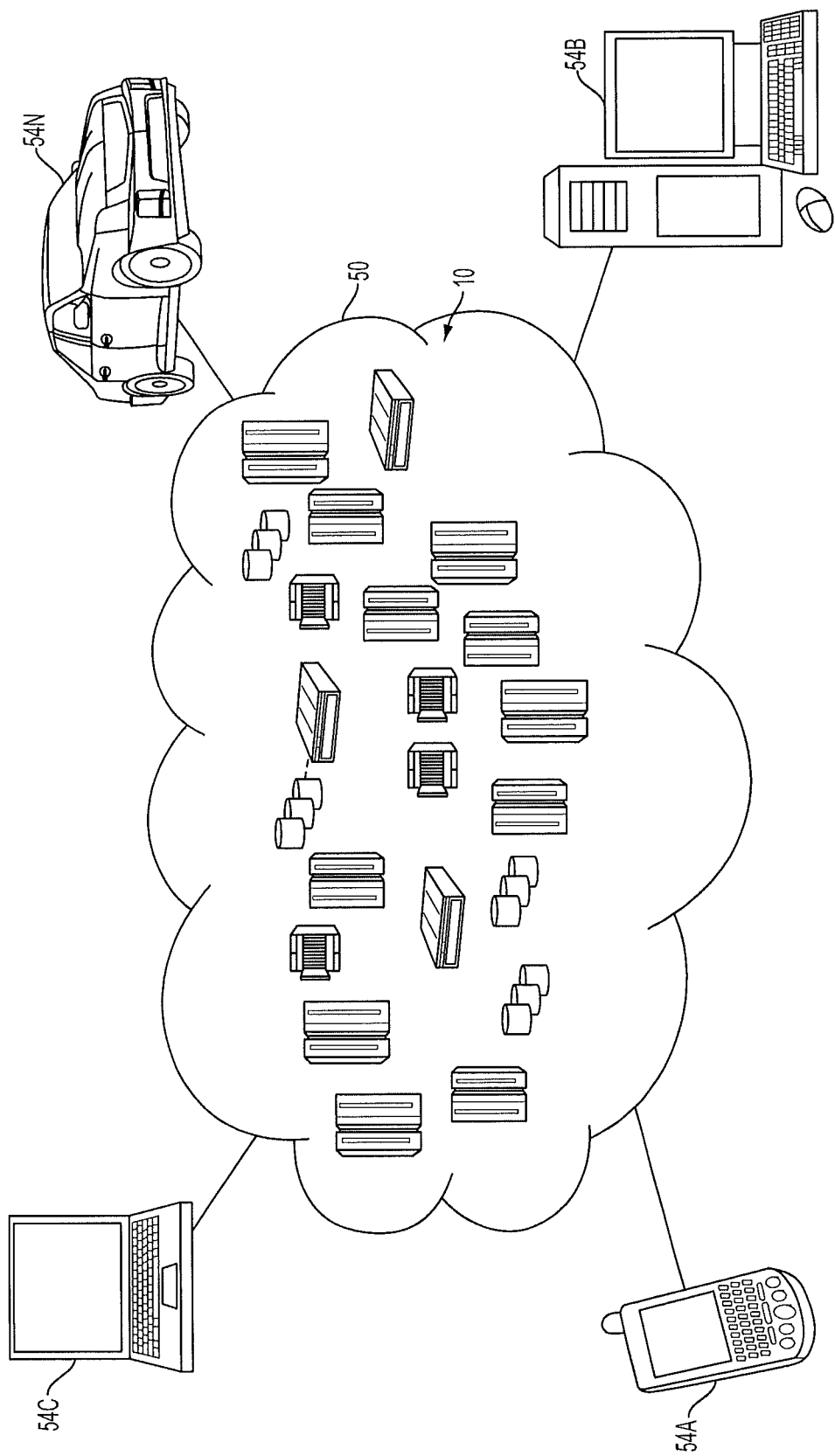
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
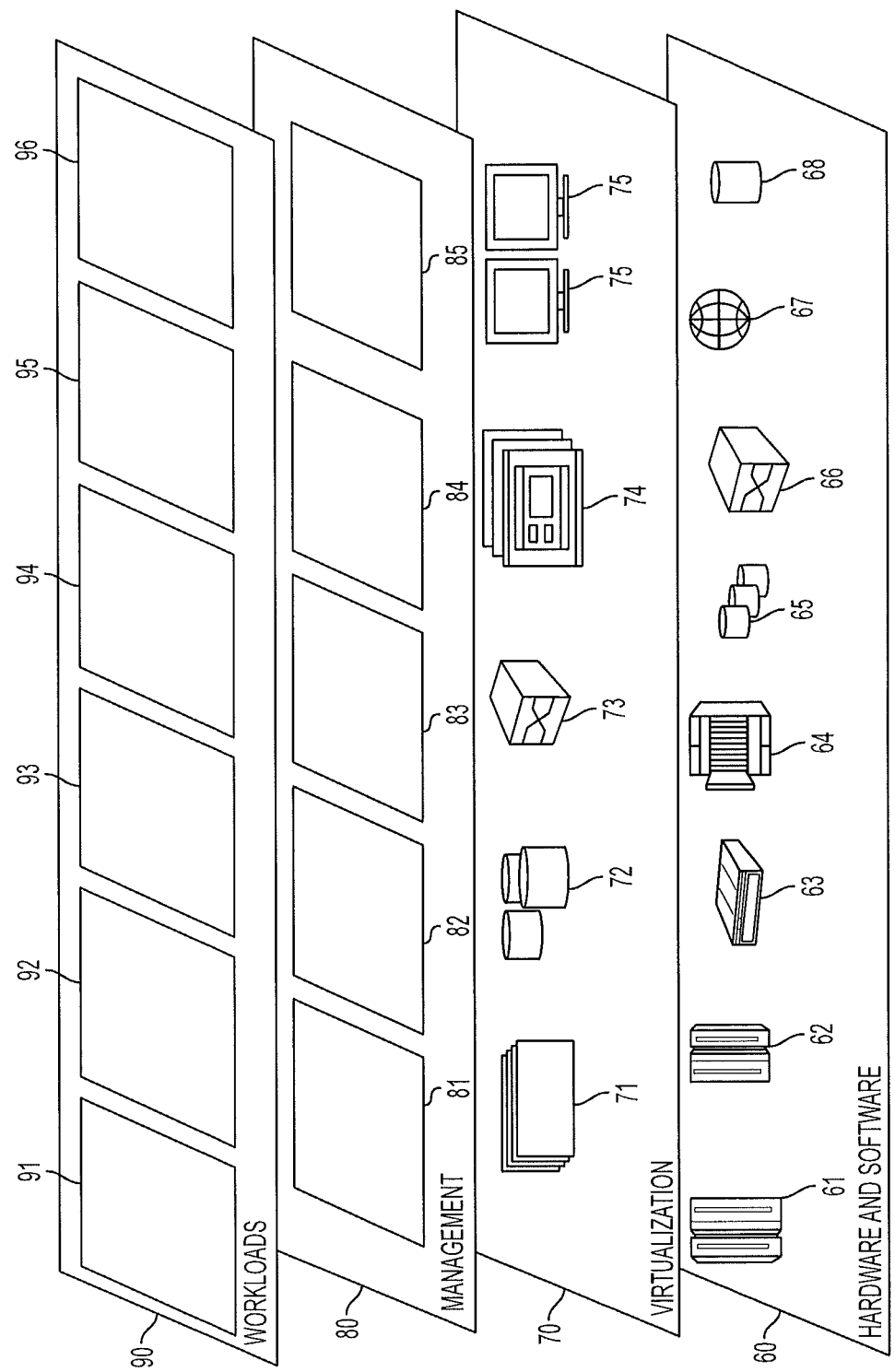
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillments 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cognitive trait based business strategy module 96 for developing targeted business strategies/campaigns based at least in part on an identified nexus between desired business outcomes and individuals and/or ad hoc population groups (e.g., ad hoc affiliation networks) having one or more particular cognitive traits in common.

As previously noted herein, the targeting of marketing and/or advertising to specific population segments is a fundamental requirement for effective marketing and advertising campaigns. Marketing and advertising business campaigns/strategies often involve an analysis of a population's tastes and needs based on information that members of the population share through various electronic media. In e-commerce settings, for example, the analysis employed is often semantic, wherein what a user searches or writes about is used to infer what a user needs. An example of a semantic-based advertising strategy is known generally as semantic targeting. Semantic targeting is a technique enabling the delivery of targeted advertising for advertisements appearing on websites and is used by online publishers and advertisers to increase the effectiveness of their campaigns. The selection of advertisements is served by automated systems based on the content displayed to the user.

Semantic-based marketing and advertising strategies typically involve scanning the content of web-pages to identify keywords. However, such systems are unable to identify the context of the entire page and therefore the inferences drawn from such analysis is inherently imprecise. For example, the word "orange" can be a color, a fruit, a telecommunications company, a mountain bike, and countless other variants.

Social network information is also used to analyze a population's tastes and needs. In a typical configuration, social network information is aggregated and associated statically with users and their social networks. Social network information is limited in that the extracted data is focused on users who have established connections to one another through the social network, and users outside of that social network are not typically included.

Neither sematic-based marketing and advertising strategies nor social network information analysis techniques create categories of potential e-commerce marketing or advertising population segments rapidly and dynamically, and independently from the limitations of traditional semantic-based or social network-based analyses.

Turning now to an overview of the present disclosure, one or more embodiments provide systems and methodologies for developing business strategies. More specifically, one or more embodiments of the present disclosure provide an e-commerce-based system and related methodologies for developing targeted marketing-type and advertisement-type business strategies based on the identification and/or grouping of marketing and/or advertising targets using the identification, analysis and/or grouping of predictive cognitive traits from among a population. As used in the present disclosure, a cognitive trait is defined as a representation of measures of a user's total behavior over some period of time (including musculoskeletal gestures, speech gestures, internal physiological changes, measured by imaging devices, microphones, physiological and kinematic sensors in a high dimensional measurement space) within a lower dimensional feature space. Our preferred embodiment uses certain feature extraction techniques for identifying certain cognitive traits. Specifically, the reduction of a set of behavioral measures over some period of time to a set of feature nodes and vectors, corresponding to the behavioral measures' representations in the lower dimensional feature space, is used to identify the emergence of a certain cognitive trait over that period of time. The relationship of one feature node to other similar nodes through edges in a graph corresponds to the temporal order of transitions from one set of measures and the feature nodes and vectors to another. Some connected subgraph of the feature nodes is herein defined as a cognitive trait. We further describe the analysis, categorization, and identification of these cognitive traits by means of further feature analysis of subgraphs, including dimensionality reduction of the subgraphs, for example by means of graphical analysis, which extracts topological features and categorizes the resultant subgraph and its associated feature nodes and edges within a subgraph feature space.

As used in the present disclosure, the term e-commerce is not limited to for-profit activities, and is intended to include activities such as philanthropic, political, social, volunteer and the like. In accordance with one or more embodiments, information in various forms (e.g., voice, text) is gathered through an electronic tool and/or web crawler from a user/client. The gathered information has emotional content (e.g., empathy, understanding, speed, terseness, etcetera) from which cognitive user/client traits may be extracted by downstream components (e.g., a graphical text analyzer of analyzer circuit 410) of the e-commerce system. These extracted cognitive traits may be utilized by other downstream components (e.g., affiliation networks and targeted business strategy systems) to develop and deliver targeted business strategies based at least in part on an identified nexus between desired business outcomes and individuals and/or ad hoc population groups (e.g., ad hoc affiliation networks) having one or more cognitive traits in common. Desired business outcomes may include a variety of outcomes, including but not limited to purchasing a product/service, joining a group, volunteering time to a political campaign, voting for a particular candidate/referendum, writing letters of support, donating to a charity and the like.

Members of ad hoc affiliation networks developed according to the present disclosure may or may not know each other or have ever communicated with each other. The commonality among members of the disclosed ad hoc affiliation networks is based on the system of the present disclosure determining that the members of the ad hoc affiliation network have one or more identified cognitive traits in common. Accordingly, business strategies, and particularly e-commerce based business strategies, developed in accordance with the present disclosure do not suffer from the inherent imprecision of semantic-based marketing and advertising strategy development systems, and further do not suffer from the limitations imposed by analyzing traditional social networks that are limited in that the extracted data is focused on users who have established connections to one another through the social network, and users outside of the social network are not typically included. Thus, business strategies, and particularly e-commerce based business strategies, developed in accordance with the present disclosure create categories of potential e-commerce marketing or advertising population segments rapidly and dynamically, and independently from the limitations of traditional semantic-based or social network-based analyses.

At least the features and combinations of features described in the immediately preceding paragraphs, including the corresponding features and combinations of features depicted in the FIGS., amount to significantly more than implementing a method of developing a business campaign in a particular technological environment. Additionally, at least the features and combinations of features described in the immediately preceding paragraphs, including the corresponding features and combinations of features depicted in the FIGS., go beyond what is well-understood, routine and conventional in the relevant field(s).

Figure 4:
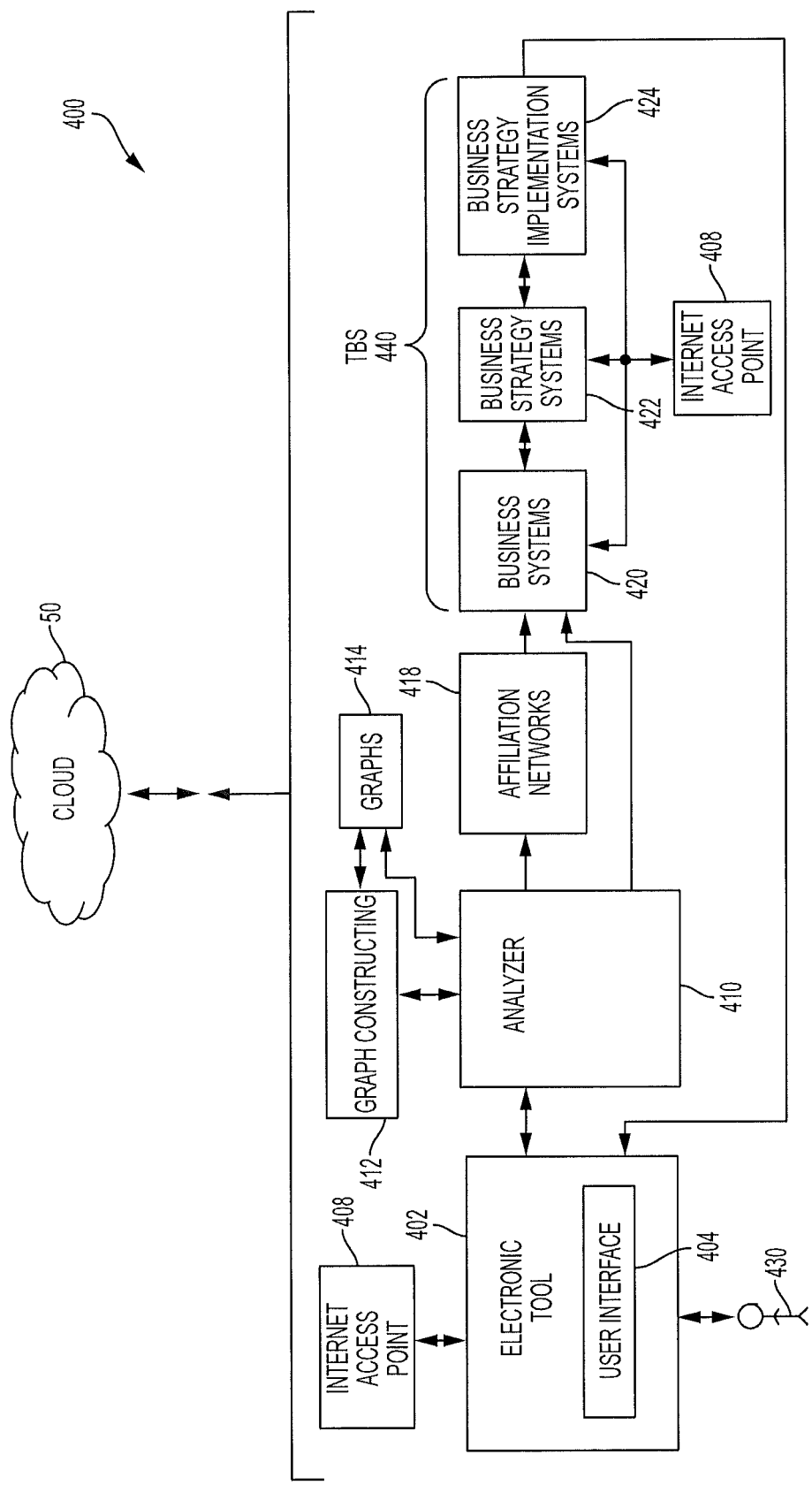
FIG. 4 depicts a diagram illustrating a system according to one or more embodiments.

Turning now to a more detailed description of the present disclosure, FIG. 4 depicts a diagram illustrating an e-commerce-based targeted business strategy development and implementation system (e-commerce system) 400 according to one or more embodiments. E-commerce system 400 includes an electronic tool 402 having a user interface 404, various internet access points 408, an analyzer circuit 410, a graph constructing circuit 412, a graphs repository 414, affiliation networks 418, business systems 420, business strategy systems 422, business strategy implementation systems 424 and cloud computing system 50, configured and arranged as shown. A user or client 430 interfaces with e-commerce system 400 via user interface 404 of electronic tool 402. Cloud 50 may supplement, support or replace some or all of the functionality of electronic tool 402, analyzer circuit 410, graph constructing circuit 412, graphs repository 414, affiliation networks 418, business systems 420, business strategy systems 422 and business strategy implementation systems 424. Additionally, some or all of the functionality of electronic tool 402, analyzer circuit 410, graph constructing circuit 412, graphs repository 414, affiliation networks 418, business systems 420, business strategy systems 422 and business strategy implementation systems 424 may be implemented as a node 10 (shown in FIGS. 1 and 2) of cloud 50.

In one or more embodiments, electronic tool 402 may be implemented as an e-commerce tool that accesses the internet (not shown) through internet access point 408. The term e-commerce refers to trading in products or services using computer networks, such as the internet. E-commerce draws on technologies such as mobile commerce, electronic funds transfer, supply chain management, internet marketing, online transaction processing, electronic data interchange (EDI), inventory management systems, and automated data collection systems. Modern e-commerce typically uses the internet for at least one part of the transaction's life cycle, although it may also use other technologies such as e-mail.

E-commerce businesses employ a variety of system functionalities, including but not limited to online shopping web sites for retail sales direct to consumers, providing or participating in online marketplaces that process third-party business-to-consumer or consumer-to-consumer sales, business-to-business buying and selling; gathering and using demographic data through web contacts and social media, business-to-business electronic data interchange, marketing to prospective and established customers by e-mail or fax (for example, with newsletters), and engaging in retail for launching new products and services. However, as previously noted herein, the term e-commerce as used in the present disclosure is not limited to for-profit activities, and is intended to include activities such as philanthropic, political, social, volunteer and the like.

As previously noted herein, electronic tool 402 may include all of the functionality of node 10 (shown in FIGS. 1 and 2) of cloud 50. Electronic tool 402 sends data to and/or receives data from the internet through internet access point 408. Electronic tool 402 also sends data to and/or receives data from the internet through a web crawler (not shown). A web crawler is a program that visits web sites and reads their pages and other information in order to create entries for a search engine index. The major search engines on the web all have such a program, which is also known as a "spider" or a "bot." Web crawlers are typically programmed to visit sites that have been submitted by their owners as new or updated. Entire sites or specific pages can be selectively visited and indexed. Web crawlers crawl through a site a page at a time, following the links to other pages on the site until all pages have been read.

Electronic tool 402 may further include functionality that allows it to receive or gather communications (e.g., text, spoken words, video, emails) made by user/client 430 to user interface 404 (e.g., a graphical user interface (GUI) based keyboard, a touch screen, etc.). For instance, electronic tool 402 may include a mobile device such as a smartphone, a smartwatch, a tablet computer, a laptop computer, etcetera, as well as stationary devices such as a desktop computer, a mainframe and the like. User interface 404 may include one or more microphones to receive audio communications made by user/client 430, along with one or more means of receiving textual communications from user/client 430, such as a virtual or physical keyboard or keypad. Electronic tool 402 may further include functionality that allows it to receive or gather communications (e.g., customer reviews at web sites, emails, instant messages, tweets, phone calls, faxes, multimedia chats, Facebook content, etc.) mined by a web crawler. Electronic tool 402 may also convert any received audio communications into textual communications using one or more now known or later developed speech-to-text techniques.

User/client 430 may be a person who interfaces with the internet for a variety of activities, including but not limited to purchasing products and services, and may have personal and/or business needs and wants. User/client 430 may be a single individual or may represent several related individuals, forming a "composite" customer or buyer of a good or a service. For example, in one or more embodiments, the user/client 430 may be one individual who is seeking to buy a product, information on a product, help, guidance, instructions and the like. User/client 430 may also, via user interface 404, express an opinion, provide a product review, provide feedback, and/or receive advertising. In one or more embodiments, user/client 430 may represent several individuals, for example, individuals in a social network, on a team, etcetera. In this case, the composite implementation of user/client 430 (C) is represented by several individuals (C1, C2, C3, . . . ) using various weights (w1, w2, w3, . . . ), and the information from the individuals may be analyzed according to the equation C=w1*C1+w2*C2+w3*C3. Often, a "primary" individual (e.g., C1) seeking to make a purchase at a web site may receive more weight (w) then his or her colleagues. Weights may depend on various factors such as a person's position in a company, a measure of network connectivity in a social network, etcetera. Furthermore, the weights may derive from a nonlinear function of time and other factors pertaining to the individual, their role, their network connectivity, and intrinsic dynamics of models of the individual. In this manner, the analysis of the "composite" user/client 430 functions as an analysis of a super-organism or hive mind that is reflective of more than one individual.

In one or more embodiments, composite advertisers may also be formed from two or more advertisers and analyzed by e-commerce system 400 (e.g., by analyzer circuit 410). Thus, a super-organism can take the form of user/client-and-advertiser (e.g., customer and advertiser) dyad, for which both the client and advertiser are analyzed as one unit. In one or more embodiments, a super-organism can take the form of user/client 430 teamed with a helper artificial agent having natural language processing capabilities that help user/client 430 make purchasing decisions. For example, the artificial agent may be used by and act on behalf of a human user/client, such that the actual downstream analysis performed by e-commerce system 400 (e.g., analyzer circuit 410) on linguistic output of an artificial agent that is in effect a proxy for direct linguistic output from user/client 430.

Graph constructing circuit 412 receives from analyzer circuit 410 data (e.g., text) of the user/client communications that were received at electronic tool 402. Graph constructing circuit 412 builds a graph from the received data. More specifically, in some embodiments wherein the received data is text data, the graph constructing circuit 412 extracts syntactic features from the received text and converts the extracted features into vectors. These syntactic vectors may have binary components for the syntactic categories such as verb, noun, pronoun, adjective, lexical root, etc. For instance, a vector [0,1,0,0 . . . ] represents a noun-word in some embodiments.

Graph constructing circuit 412 may also generate semantic vectors from the received text using one or more now known or later developed techniques (e.g., Latent Semantic Analysis and WordNet). The semantic content of each communication in the text may be represented by a vector, of which the components are determined by singular value decomposition of word co-occurrence frequencies over a large database of documents.

A graph generated by the graph constructing circuit 412 may be in the form of: G={N, E, $\check{W}$}, where the nodes N represent tokens (e.g., words or phrases), the edges E represent temporal precedence in the device user's communications, and each node possesses a feature vector $\check{W}$ defined in some embodiments as a direct sum of the syntactic and semantic vectors and additional non-textual feature vector (e.g., a predetermined vector for the identity of a person). That is, in some embodiments, the feature vector $\check{W}$ is defined by the equation: $\check{W}=\check{w}_{sym}\oplus\check{w}_{sem}\oplus\check{w}_{ntxt}$, where $\check{W}$ is the feature vector, $\check{w}_{sym}$ is the syntactic vector, $\check{w}_{sem}$ is the semantic vector, and $\check{w}_{ntxt}$ is the non-textual features. Additional details of exemplary graphs 500, 520 are shown in FIGS. 5A and 5B, which are described in greater detail later in this disclosure.

Graph constructing circuit 412 updates the graphs as more text from user/client 430 is received from analyzer circuit 410 as user/client 430 makes more communications. Graph constructing circuit 412 stores the generated graph(s) in graphs repository 414.

Analyzer circuit 410 performs a graphical text analysis on the graph generated by graph constructing circuit 412. As a specific example of a graphical text analysis, in some embodiments, analyzer circuit 410 analyzes the graph G for the person generated by graph constructing circuit 412 based on a variety of topological features. The variety of features includes graph-theoretical topological measures of the graph skeleton (i.e., a graph without features vectors: $G_{Sk}=\{N, E\}$) such as degree distribution, density of small-size motifs, clustering, centrality, etc. Similarly, additional values may be extracted by including the features vectors for each node of the graph. One such instance is the magnetization of the generalized Potts model (e.g., $H=\Sigma_n E_{nm}\vec{W_n}\uparrow\vec{W_m}$) such that temporal proximity (e.g., number of edges between two nodes) and feature similarity are taken into account. These features, which incorporate the syntactic, semantic and dynamical components of the communications, are then combined as a multi-dimensional features vector $\check{F}$ that represents a sample. This feature vector is finally used to train a standard classifier: $M=M(\check{F}_{train}, C_{train})$, to discriminate the samples that belong to different conditions C, such that for each sample the classifier estimates its condition identity based on the extracted features: $C(sample)=M(\check{F}_{sample})$. Additional details of the various equations illustrating a core algorithm of a graphical text analysis function in accordance with one or more embodiments are shown in FIG. 6 and described in more detail later herein. Additionally, although illustrated separately in FIG. 4, the functionality of graph constructing circuit 412, graphs repository 414 and analyzer circuit 410 may be provided in a single component.

In some cases, analyzer circuit 410 can determine the cognitive traits of user/client 430 only with a confidence level (CL). When analyzer circuit 410 determines that the value of CL is below a threshold (TH) (i.e., CL<TH), a change in the output of business strategy implementation systems 424 (e.g., type of advertisement, or a set of steps used in making a sale) may not take place. However, if CL>TH, a change in the output of business strategy implementation systems 424 may be automatically triggered.

Additionally, if CL<TH, a confidence-increasing action may automatically be triggered, such as an analysis of other people in a social network of user/client 430 (e.g., people close to the user/client 430), an analysis of prior fragments of text and/or speech of user/client 430 (e.g., person seeking to make a purchase), an analysis of a prior fragments of text and/or speech of individuals in a social network of user/client 430. Various weights may be assigned to the prior fragment. For example, the further into the past a fragment occurs, the lower the weights of such fragments.

Analyzer circuit 410 may trigger other confidence-level-increasing actions automatically if CL<TH. For example, more public information may be quickly obtained about user/client 430 such as posts made in Facebook, various public communications, an analysis of past buying queries, demographic information associated with user/client 430, and the like. The use of such information may be approved in an opt-in fashion so that user/client 430 gives permission to perform such analyses because he or she wishes to receive better and more useful exposure to goods and services.

Another confidence-level-increasing action is to trigger e-commerce system 400 (e.g., via electronic tool 402) to query the user/client 430 about whether it is estimating a cognitive trait of user/client 430 appropriately or correctly. For example, e-commerce system 400 may include natural language processing question/answer (NLP Q/A) functionality and/or systems (e.g., within electronic tool 402) that answer natural language questions by querying data repositories and applying elements of language processing, information retrieval and machine learning to arrive at a conclusion. An example NLP Q/A system and/or functionality is IBM'S DeepQA technology as described in U.S. Pat. No. 8,275,803, issued Sep. 25, 2012, which is assigned to the assignee of the present disclosure, and which is incorporated by reference herein in its entirety. Such a NLP Q/A system may ask user/client 430 if he or she is confused or angry in order to increase the value of CL. For cases in which user/client 430 includes an artificial agent, the use of such extra information may be also approved in an opt-in fashion so that the artificial agents (or its owners) give permission to perform such analyses because the artificial agent will receive more useful advertisements.

Affiliation networks 418 develop secondary, ad hoc networks of individuals, referred to herein as affiliation networks, based on the cognitive traits identified and clustered by analyzer circuit 410. The affiliation networks developed by affiliation network 418 is based on identified cognitive traits and does not require that individuals in the affiliation network know each other or have interacted in the past. Business systems 420 utilize both affiliation network data from affiliation networks 418 and cognitive trait data from analyzer circuit 410 as inputs to a variety of business processes and/or functions including but not limited marketing systems, merchandising systems, supply chain systems, and others. Business strategy systems 422 develop business strategies that are targeted based at least in part on an identified nexus between desired business outcomes (e.g., purchasing a product or a service) and individuals and/or groups having one or more cognitive traits in common. Business strategy implementation system 424 develops systems to implement business strategies that are targeted based at least in part on an identified nexus between desired business outcomes (e.g., purchasing a product or a service) and individuals and/or groups having one or more particular cognitive trait. Business systems 420, business strategy systems 422 and business strategy implementation systems 424 all have access to the internet through internet access point 408. Thus, the ability of e-commerce system 400 to identify individuals and/or groups having one or more cognitive traits in common enables business systems 420, business strategy systems 422 and business strategy implementation systems 424 to identify a nexus between desired business outcomes and individuals and/or groups having one or more cognitive traits in common, and further enables these business systems to plan and execute dynamic business strategies that anticipate, exploit and closely link to the cognitive traits and the identified nexus.

The overall functionality provided by business systems 420, business strategy systems 422 and business strategy implementation systems 424 are identified collectively as a targeted business strategy development system (TBS) 440, which may take a wide variety of formats, and which may or may not include each function of business systems 420, business strategy systems 422 and business strategy implementation systems 424. For example, TBS 440 may be delivered to user/client 430 via electronic tool 402 by an artificial (software) agent (e.g., an avatar, or a live image of a real person) that interacts with user/client 430. The decision to switch to, or make use of, a virtual world setting may be depend on the analyses performed. Guidance and prompts used by an advertiser may be switched or enhanced and may also relate to guidance on how the seller or marketer may present information in terms of such aspects as speed of presentation, vocal characteristics, word use in emails, emotionality, etcetera. The marketer and seller may be a friendly human, a team of humans, a NLP Q/A system, etcetera. The cognitive traits of user/client 430 identified by e-commerce system 400 are used to enhance such NLP Q/A responses, so that the presented information or answers have higher value than that developed without the cognitive traits identified according to the present disclosure.

Based on the above analysis of cognitive traits of user/client 430, if an alternative marketer or seller is selected, and if the alternative agent is a Q&A artificial agent, information may be emotively conveyed to user/client 430 as useful. For example, the cognitive traits of user/client 430 may be transformed into data that additionally represents a simulated emotional state and potentially transmitted using an avatar in a virtual world. Data representing an avatar that expresses the simulated emotional state may be generated and displayed. Also, a prosody analyzer enhances the interpretation of natural language utterances. Cognitive traits may be distributed over a client/server architecture such that the scope of emotion recognition processing tasks can be allocated on a dynamic basis based on processing resources, channel conditions, client loads etcetera. The partially processed prosodic data can be sent separately or combined with other speech data from electronic tool 402 and streamed to a server for a real-time response. Training of the prosody analyzer with real world expected responses improves emotion modeling and the real-time identification of potential features such as emphasis, intent, attitude and semantic meaning in the speaker's utterances.

TBS 440 (e.g., a marketer or a seller) may respond through voice, email, fax, chat messages associated with an avatar, instant messages, etcetera. The responses may be in real time (e.g., on a phone call) or asynchronous (e.g., as with emails). The analysis may be used to change avatar characteristics (e.g., avatar appearance in a store, motions, and vocal characteristics in a virtual universe) and/or scenery (e.g., a building vs. a forest).

E-commerce system 400 may learn to be more effective. The effectiveness of systems 400 may be judged in the real shopping world comprising real stores. For example, it is possible to measure the effectiveness of an advertisement presented on a mobile device. Information on the reaction to the advertisement is stored on the device and then accessed by a server or the advertiser. The method involves tracking device location, presenting to the user an advertisement or point of interest, storing click-throughs on the advertisement or point of interest to mark a first success, and monitoring device current position to determine whether the device reaches a location associated with the advertisement or point of interest to mark a second success, counting successes, and providing success feedback to the advertiser, for example, through server queries. This information may also be fed into methodology 800 (shown in FIG. 8).

It is also possible to enhance the approach described herein using user responses and using methods known in the art. For example, an advertising analysis system may also provide a possibly optimal or effective advertisement from an incoming advertisement having a plurality of modifiable advertisement elements and methods for manufacturing and using same. Analyzing each possible advertisement variation of the advertisement, the advertising analysis system applies multivariate testing to identify the advertisement variations with selected combinations of advertisement elements as being optimal test cases and provides the identified advertisement variations as test advertisements. User response to each test advertisement is compiled as test results during a predetermined test period. Based upon the test results, the advertising analysis system performs multivariate testing to analyze the interrelation among the tested advertisement elements and extrapolates the test results to predict the effectiveness of each advertisement variation. The advertising analysis system thereby automatically provides a predetermined number of the advertisement variations with the optimal predicted effectiveness as the more-effective advertisements in a timely manner. This information may be fed into methodology 800 (shown in FIG. 8).

Thus, e-commerce system 400 significantly expands the scope of data that may be used to both assess and inform current and future business strategy campaigns. Significantly, the additional data accessed by e-commerce system 400 provides access to an even wider range of historical data of user/client 430 that may be provided to analyzer circuit 410 for feature extraction analysis. For example, cloud 50 may provide information from social graphs, emails, recorded interviews and conversations of user/client 430.

Additional details of more specific implementations of various components of e-commerce system 400 will now be described with reference to FIGS. 5A to 8, wherein electronic tool 402 converts the different forms of information of user/client 430 to text, and analyzer circuit 410A (shown in FIG. 7) includes a graphical text analyzer 702 (shown in FIG. 7).

Referring now to FIG. 5A, there is depicted a graphical text analyzer's output feature vector in the form of a word graph 500 having an ordered set of words or phrases shown as nodes 502, 504, 506, each represented by its own features vector 510, 512, 514 according to one or more embodiments. Each features vector 510, 512, 514 is representative of some additional feature of its corresponding node 502, 504, 506 in some word/feature space. Word graph 500 is useful to extract topological features for certain vectors, for example, all vectors that point in the upper quadrant of the feature space of words. The dimensions of the word/feature space might be parts of speech (verbs, nouns, adjectives), or the dimensions may be locations in a lexicon or an online resource of the semantic categorization of words in a feature space such as WordNet, which is the trade name of a large lexical database of English. In WordNet, nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated with a browser. WordNet is also freely and publicly available for download from the WorldNet website, www.worldnet.princeton.edu. The structure of WordNet makes it a useful tool for computational linguistics and natural language processing.

FIG. 5B illustrates a graph 520 for a group of persons (e.g., three persons depicted as black, grey and white nodes). Specifically, for example, the nodes for a person are depicted in black, the nodes for another person are depicted in white, and the nodes for yet another person are depicted in grey. The graph 520 may be built for all persons in the group or constructed by combining graphs for individual persons. In some embodiments, the nodes of the graph 520 may be associated with identities of the persons. In some embodiments, the analyzer circuit 410 may discard or anonymize the graphs of communications stored in the graphs repository 414 for reasons of privacy, after graphical text analysis is performed on those graphs. Analysis of groups of users may be useful in categorizing a user's cognitive trait within different contexts, for example while on a phone call with other specific individuals.

FIG. 6 depicts Equations A-H, which illustrate features of a core algorithm that may be implemented by analyzer circuit 410A (shown in FIG. 7) having a graphical text analysis module 702 (shown in FIG. 7) according to one or more embodiments. Analyzer module 410A shown in FIG. 7 is an implementation of analyzer module 410 (shown in FIG. 4), wherein text input 720 receives text of user/client 430 (shown in FIG. 4). The text received at text input 720 may have been converted from some other form, such as speech, to text. The functionality that converts other, non-text data of user/client 430 to text may be provided in electronic tool 402, analyzer circuit 410 or as a stand-alone circuit.

Figure 7:
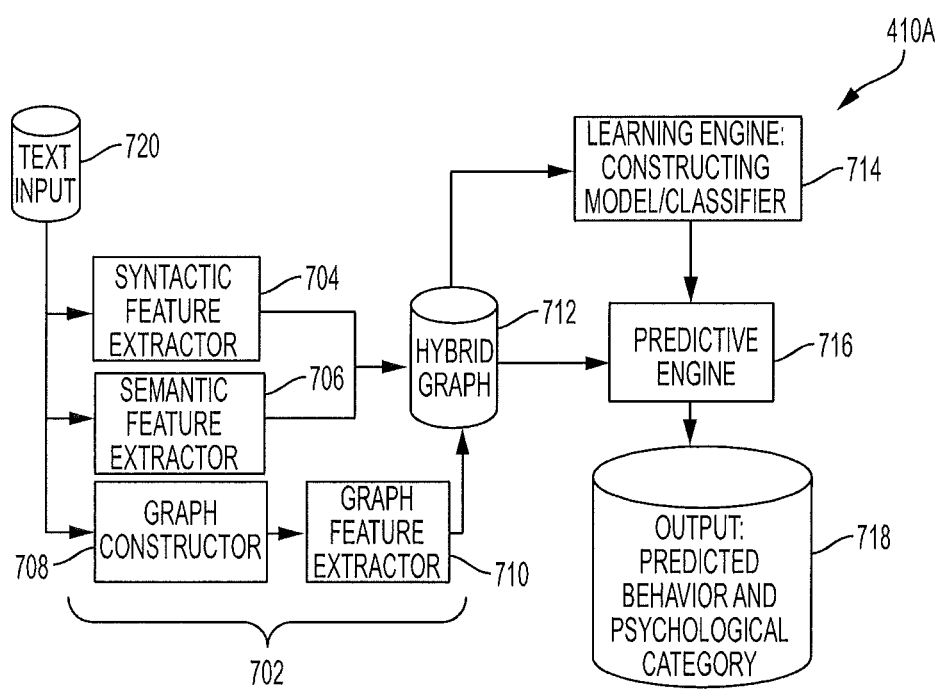
FIG. 7 depicts of a diagram of a graphical text analysis system according to one or more embodiments.

Continuing with a description of Equations A-H of FIG. 6 including selected references to corresponding elements of analyzer module 410A and graphical text analysis module 702 shown in FIG. 7, text or speech-to-text is fed into a standard lexical parser (e.g., syntactic feature extractor 704 of FIG. 7) that extracts syntactic features, which are converted to vectors. Such vectors can have binary components for the syntactic categories verb, noun, pronoun, etcetera, such that the vector represented by Equation A represents a noun word.

The text is also fed into a semantic analyzer (e.g., semantic feature extractor 706 of FIG. 7) that converts words into semantic vectors. The conversion into semantic vectors can be implemented in a number of ways, including, for example, the use of latent semantic analysis. The semantic content of each word is represented by a vector whose components are determined by the singular value decomposition of word co-occurrence frequencies over a large database of documents. As a result, the semantic similarity between two words "a" and "b" can be estimated by the scalar product of their respective semantic vectors represented by Equation B.

A hybrid graph is created in accordance with Equation C in which the nodes "N" represent words or phrases, the edges "E" represent temporal precedence in the speech, and each node possesses a feature vector "W" defined as a direct sum of the syntactic and semantic vectors plus additional non-textual features (e.g. the identity of the speaker) as given by Equation D.

The graph "G" of Equation C is then analyzed based on a variety of features, including standard graph-theoretical topological measures of the graph skeleton as shown by Equation E, such as degree distribution, density of small-size motifs, clustering, centrality, etcetera. Similarly, additional values can be extracted by including the feature vectors attached to each node. One such instance is the magnetization of the generalized Potts model as shown by Equation F such that temporal proximity and feature similarity are taken into account.

The features that incorporate the syntactic, semantic and dynamical components of speech are then combined as a multi-dimensional features vector "F" that represents the speech sample. This feature vector is finally used to train a standard classifier according to Equation G to discriminate speech samples that belong to different conditions "C," such that for each test speech sample the classifier estimates its condition identity based on the extracted features represented by Equation H.

FIG. 7 depicts a diagram of an analyzer circuit 410A having a graphical text analysis circuit 702 according to one or more embodiments. Analyzer circuit 410A is an implementation of analyzer circuit 410 (shown in FIG. 4). Analyzer circuit 410A includes text input 720, a syntactic feature extractor 704, a semantic feature extractor 706, a graph constructor 708, a graph feature extractor 710, a hybrid graph circuit 712, a learning engine 714, a predictive engine 716 and an output circuit 718, configured and arranged as shown. In general, graphical text analyzer 702 functions to convert inputs from text input circuit 720 into hybrid graphs (e.g., word graph 500 shown in FIG. 5A), which is provided to learning engine 714 and predictive engine 716. In addition to the graphical text analyzer algorithm illustrated in FIG. 6 and described above, additional details of the operation of graphical text analyzer 702 are available in a publication entitled "Speech Graphs Provide A Quantitative Measure Of Thought Disorder In Psychosis," authored by Mota, et al., and published by PLOS ONE, April 2012, Volume 7, Issue 4, the entire disclosure of which is incorporated by reference herein in its entirety.

As noted, graphical text analyzer 702 provides word graph inputs to learning engine 714, and predictive engine 716, which constructs predictive features or model classifiers of the state of the individual in order to predict what the next state will be, i.e., the predicted behavioral or psychological category of output circuit 718. Accordingly, predictive engine 716 and output circuit 718 may be modeled as Markov chains.

Figure 8:
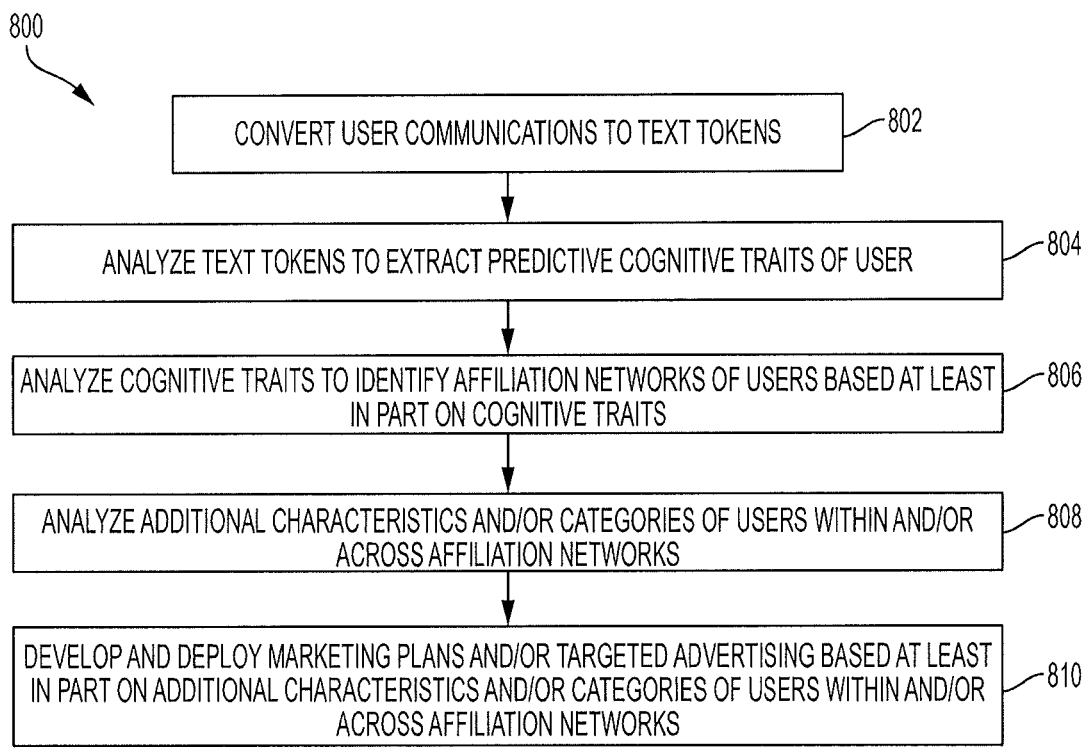
FIG. 8 depicts a flow diagram of a methodology according to one or more embodiments.

FIG. 8 depicts a flow diagram of a semantic-free methodology 800 performed by e-commerce system 400 (shown in FIG. 4) according to one or more embodiments. Although the operations of methodology 800 are illustrated in a particular order, it will be understood by persons of ordinary skill in the relevant art that the order of the illustrated operations may be changed without departing from the teachings of the present disclosure. In addition, it will be understood by persons of ordinary skill in the relevant art that one or more of the illustrated operations my omitted, and/or operations not shown may be incorporated, without departing from the teachings of the present disclosure. Methodology 800 begins at block 802 by converting user communications to text tokens, and block 804 analyzes the text tokens to extract cognitive traits of users that may be predictive. Block 806 analyzes the cognitive traits to identify affiliation networks of users based at least in part on the cognitive traits. Block 808 analyzes additional characteristics and/or categories of users within and/or across affiliation networks. Block 810 develops and deploys targeted marketing plans and/or targeted advertising based at least in part on additional characteristics and/or categories of users within and/or across affiliation networks.

Thus it can be seen from the forgoing detailed description that one or more embodiments of the present disclosure provide technical benefits and advantages. Specifically, methodology 800 and e-commerce system 400 analyze cognitive traits of users of e-commerce tools based on a semantic-free analysis of text input to these tools, for example reviews of products. These categories then allow grouping of users based on cognitive types, without secondary information from social networks, etcetera. More specifically, speech to text and text may be input to an e-commerce tool and collected in real time as tokens from each user of the tool (for example a reviewer of a product; in sequence spoken or entered). Text tokens are analyzed by a graphical text analyzer using machine-learning tools that extract predictive features from token sequences, and makes inferences about the category of the current cognitive category of a user, their emotional state, and desires. Categories for each user are analyzed and compared, clustered, and used to create affiliation networks of users based on cognitive types. Product purchases, positive reviews, and other feedback from a user are related through these affiliation networks to other users. Targeted marketing plans and targeted advertising are deployed to related users based on the affiliation and the purchases and reviews within their network.

Advantageously, members of the ad hoc affiliation networks developed according to the present disclosure may or may not know each other or have ever communicated with each other. The commonality among members of the disclosed ad hoc affiliation networks is based on the system of the present disclosure determining that the members of the ad hoc affiliation network have one or more identified cognitive traits in common. Accordingly, business strategies, and particularly e-commerce based business strategies, developed in accordance with the present disclosure do not suffer from the inherent imprecision of semantic-based marketing and advertising strategy development systems, and further do not suffer from the limitations imposed by analyzing traditional social networks that are limited in that the extracted data is focused on users who have established connections to one another through the social network, and users outside of the social network are not typically included. Specifically, the ability of the disclosed e-commerce system to identify individuals and/or groups having one or more cognitive traits in common enables the various business systems to identify a nexus between desired business outcomes and individuals and/or groups having one or more cognitive traits in common, and to therefore plan and execute dynamic business strategies that anticipate, exploit and closely link to the cognitive traits and the identified nexus. Thus, business strategies, and particularly e-commerce based business strategies, developed in accordance with the present disclosure create categories of potential e-commerce marketing or advertising population segments rapidly and dynamically, and independently from the limitations of traditional semantic-based or social network-based analyses.

Figure 9:
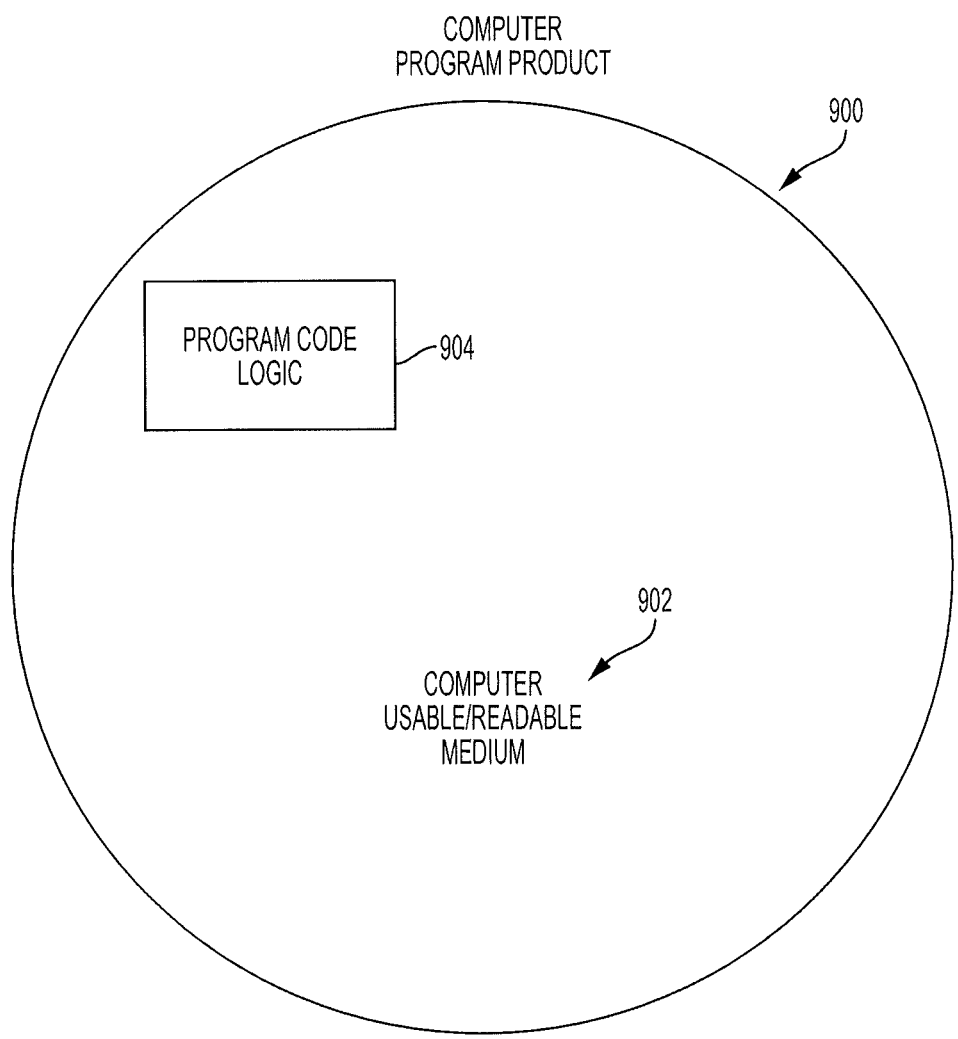
FIG. 9 depicts a diagram of a computer program product according to one or more embodiments.

Referring now to FIG. 9, a computer program product 900 in accordance with an embodiment that includes a computer readable storage medium 902 and program instructions 904 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method of operating a computing device for identifying and communicating with an ad hoc affinity network of individuals, the computer implemented method comprising:

storing, using a memory of the computing device, text data generated by a user;

using the computing device to perform an ad hoc affinity network identification method comprising:

deriving, using a graphical text analyzer circuit of the computing device, cognitive trait data representing a cognitive trait of the user based at least in part on the text data generated by the user;

wherein the cognitive trait data comprises a representation of measures of the user's total behavior over a period of time within a lower dimensional feature space;

wherein the graphical text analyzer circuit comprises a graphical text analysis module communicatively coupled to a learning engine and a predictive engine;

wherein the graphical text analysis module of the graphical text analyzer circuit is configured to apply feature extraction techniques to generate word graphs;

wherein the feature extraction techniques comprises reducing the set of behavioral measures of the user over the period of time to a set of feature nodes and vectors that correspond to representations in the lower dimensional feature space of the set of behavioral measures of the user over the period of time;

based at least in part on the learning engine receiving multiple instances of the word graphs, applying, using the learning engine, classifier training techniques to the multiple instances of the word graphs to generate and continuously refine a cognitive trait model of the user;

based at least in part on the predictive engine receiving the word graphs and the cognitive trait model of the user, predicting, using the predictive engine, a predicted cognitive trait of the user;

wherein the predicted cognitive trait of the user comprises the representations in the lower dimensional feature space of the set of behavioral measures of the user over the period of time; and determining, using a decision engine of the computing device, based at least in part on the predicted cognitive trait of the user, that the user is a member of the ad hoc affinity network of individuals;

wherein all members of the ad hoc affinity network of individuals share the predicted cognitive trait;

using the computing device to perform a communications method for generating communications for the ad hoc affinity network identification, the communications method comprising:

transforming the cognitive trait data into an artificial agent configured and arranged to communicate with the user in a manner that reflects the predicted cognitive trait of the user;

identifying a nexus between a desired outcome and the predicted cognitive trait that is shared by all members of the ad hoc affinity network;

generating a communication targeted to the members of the ad hoc affinity network based at least in part on the nexus between the desired outcome and the predicted cognitive trait that is shared by all members of the ad hoc affinity network; and providing the communication to the user using the artificial agent.

2. The computer implemented method of claim 1, wherein all members of the ad hoc affinity network of individuals have been selected for and included in the ad hoc affinity network based on application of the computer implemented method of claim 1 individually to each of a plurality of users.

3. The method of claim 1, wherein the user comprises a super-organism.

* * * * *